(12) United States Patent
Nishitani

(10) Patent No.: US 8,624,540 B2
(45) Date of Patent: Jan. 7, 2014

(54) DRIVING APPARATUS

(75) Inventor: Hitoshi Nishitani, Tokyo (JP)

(73) Assignee: Canon Kabushiki Kaisha (JP)

( * ) Notice: Subject to any disclaimer, the term of this patent is extended or adjusted under 35 U.S.C. 154(b) by 257 days.

(21) Appl. No.: 13/157,352

(22) Filed: Jun. 10, 2011

(65) Prior Publication Data

US 2011/0304293 A1    Dec. 15, 2011

(30) Foreign Application Priority Data

Jun. 10, 2010    (JP) ................ 2010-132888

(51) Int. Cl.
*H02P 8/00*    (2006.01)

(52) U.S. Cl.
USPC ............. 318/696; 318/400.06; 318/400.38

(58) Field of Classification Search
USPC ............... 318/696, 400.06, 400.38
See application file for complete search history.

(56) References Cited

U.S. PATENT DOCUMENTS

| 7,193,386 | B2 | 3/2007 | Misumi |
| 7,764,033 | B2 * | 7/2010 | Yasuda ............. 318/400.38 |
| 7,872,439 | B2 * | 1/2011 | Yasuda ............. 318/704 |
| 8,035,327 | B2 * | 10/2011 | Mizumaki ............. 318/466 |
| 8,278,851 | B2 | 10/2012 | Kiyamura et al. |

FOREIGN PATENT DOCUMENTS

| CN | 101257274 A | 9/2008 |
| CN | 101729010 A | 6/2010 |
| JP | 9-331666 A | 12/1997 |
| JP | 2003180096 A | 6/2003 |
| JP | 2004015898 A | 1/2004 |

OTHER PUBLICATIONS

Chinese Office Action cited in Chinese counterpart application No. CN201110156604.1, dated Jul. 19, 2013. English translation provided.

* cited by examiner

*Primary Examiner* — Erick Glass
(74) *Attorney, Agent, or Firm* — Rossi, Kimms & McDowell LLP

(57) ABSTRACT

A driving apparatus has a correction value output unit for outputting correction values $\Delta Ta$ and $\Delta Tb$ to correct differences between signals which are output from an A sensor a B sensor when an A-phase coil and a B-phase coil are not energized and signals which are output from the A sensor and the B sensor when the A-phase coil and the B-phase coil are energized. An energization direction of the A-phase coil is switched on the basis of a time A which is measured by a time measurement unit and the correction value $\Delta Ta$ which is output from the correction value output unit. An energization direction of the B-phase coil is switched on the basis of a time B which is measured by the time measurement unit and the correction value $\Delta Tb$ which is output from the correction value output unit.

10 Claims, 12 Drawing Sheets

DRIVING APPARATUS

BACKGROUND OF THE INVENTION

1. Field of the Invention

The present invention relates to a driving apparatus and, more particularly, to a driving apparatus for switching energization of a coil in accordance with an output from a detection unit for detecting a magnetic pole of a rotor.

2. Description of the Related Art

Japanese Patent Application Laid-Open No. H09-331666 (corresponding to U.S. Pat. No. 5,831,356) discloses such a technique that a sensor as a Hall device (hereinbelow, abbreviated to "sensor") is provided for a stepper motor (hereinbelow, abbreviated to "motor") to detect a rotational position of a rotor magnet.

According to such a technique, together with an ordinary step driving, a feed back driving for switching energization of a coil at proper timing according to a desired speed or load can be performed. Thus, the motor can be used in a wide speed region from a low speed region to a high speed region and, at the same time, a high output torque can be attained.

FIG. 9 is a diagram for describing an example of controlling an energization switching timing of each coil on the basis of sensor outputs in a motor having two sensors and coils for two phases. Such energization switching timing control can be achieved by, for example, a motor driving circuit (not shown). A description will be made hereinbelow on the assumption that the two sensors are an A sensor and a B sensor and the coils for two phases are an A-phase coil and a B-phase coil. When it is detected that an output of the A sensor has changed from a Low level (hereinbelow, abbreviated to "L") to a High level (hereinbelow, abbreviated to "H") at timing denoted by T1 in the diagram, the A-phase coil is subsequently energized in a + direction at timing denoted by T2 in the diagram, which is reached after the elapse of a preset time Ta1. After that, when it is detected that an output of the B sensor has changed from L to H at timing denoted by T3 in the diagram, the B-phase coil is subsequently energized in the + direction at timing denoted by T4 in the diagram which is reached after the elapse of a preset time Tb1. After that, such control that times (Ta2~Ta4) and (Tb2~Tb4) which are required until the energization switching of the coil is performed after an H/L inversion of the sensor happened are increased or decreased or are held to be constant is continuously made. According to this, it is possible to cause the motor to rotate acceleratedly, deacceleratedly, or at a constant speed against a rapid load change.

SUMMARY OF THE INVENTION

According to an aspect of the present invention, a driving apparatus of the present invention comprises: a rotor on which different magnetic poles are magnetized alternately in a circumferential direction; a first coil configured to be energized to excite a first yoke; a second coil configured to be energized to excite a second yoke; a first detection unit configured to alternately detect the different magnetic poles of the rotor when the rotor is rotated, thereby outputting a signal; a second detection unit configured to alternately detect the different magnetic poles of the rotor when the rotor is rotated, thereby outputting a signal of a phase different from that of the signal which is output from the first detection unit; a time measurement unit configured to measure a first time from after the first detection unit detects a change of the magnetic pole of the rotor and measure a second time from after the second detection unit detects the change of the magnetic pole of the rotor; a correction value output unit configured to output correction values for correcting differences between the respective signals which are output from the first detection unit and the second detection unit when the first coil and the second coil are not energized and the respective signals which are output from the first detection unit and the second detection unit when the first coil and the second coil are energized; and an energization control unit configured to switch an energization direction of the first coil on the basis of the first time which is measured by the time measurement unit and the correction value which is output from the correction value output unit and switch an energization direction of the second coil on the basis of the second time which is measured by the time measurement unit and the correction value which is output from the correction value output unit.

According to the invention, the driving apparatus which can attain the proper driving control even if the outputs of the detection units were affected by the energization of the coil, can be provided.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First, the fact that an output voltage of a sensor fluctuates depending on a switching of energization of a coil will be described.

Figure 9:
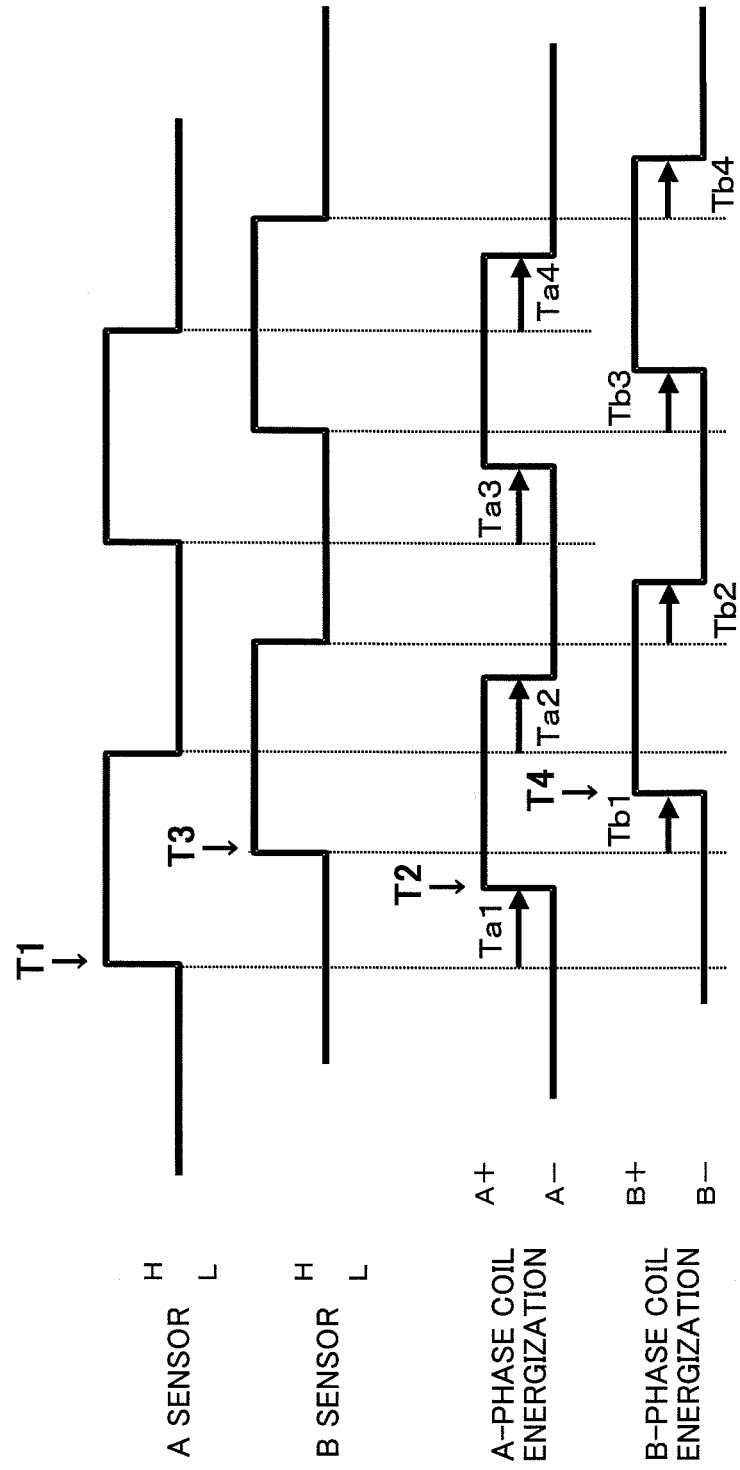
FIG. 9 is a diagram illustrating control of energization switching timing of coils for two phases based on two sensor outputs.
Figure 10:
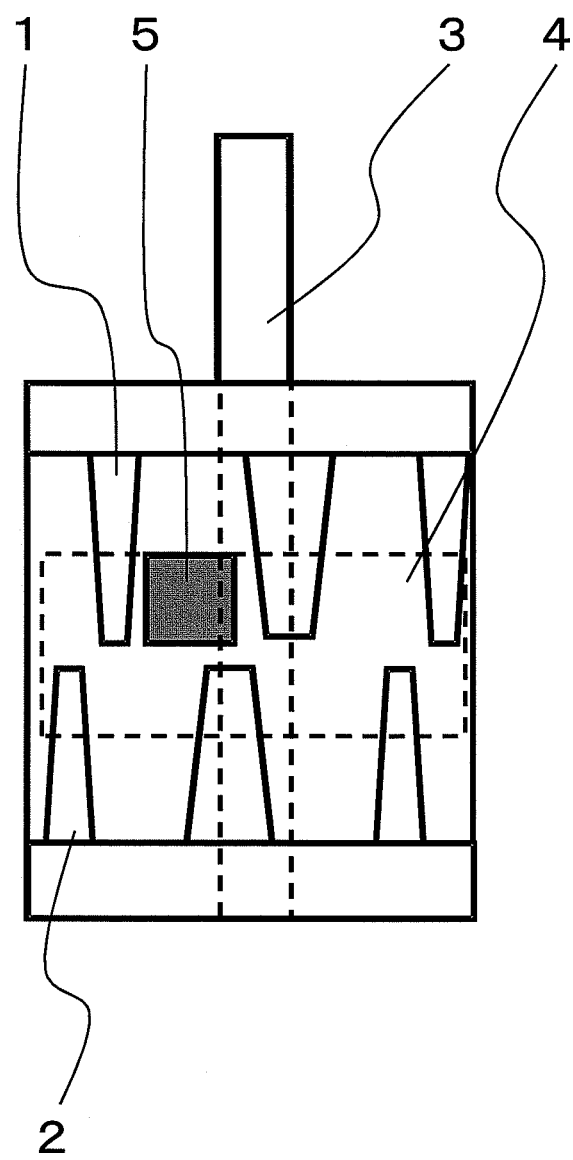
FIG. 10 is a side elevational view of the motor illustrated in FIG. 9.

FIG. 10 is a side elevational view of a motor illustrated in FIG. 9 and a casing member, coils, and wiring members for energizing the coils are omitted therein. In FIG. 10, an A-phase yoke 1 is arranged such that a magnetic pole is excited by energizing the A-phase yoke and a B-phase yoke 2 is arranged such that a magnetic pole is excited by energizing the B-phase yoke. A north pole and a south pole are magnetized alternately on a peripheral surface of a rotor magnet 4. The rotor magnet 4 and a rotational axis 3 are integrated. A sensor 5 is arranged so as to face the peripheral surface of the rotor magnet 4 and detects a rotation of the rotor magnet 4. When the motor is miniaturized, the sensor 5 is arranged in close vicinity to the A-phase yoke 1 and the B-phase yoke 2 as illustrated in FIG. 10. Thus, an output voltage of the sensor 5 fluctuates by magnetic fields generated at the A-phase yoke 1 and the B-phase yoke 2.

Figure 11:
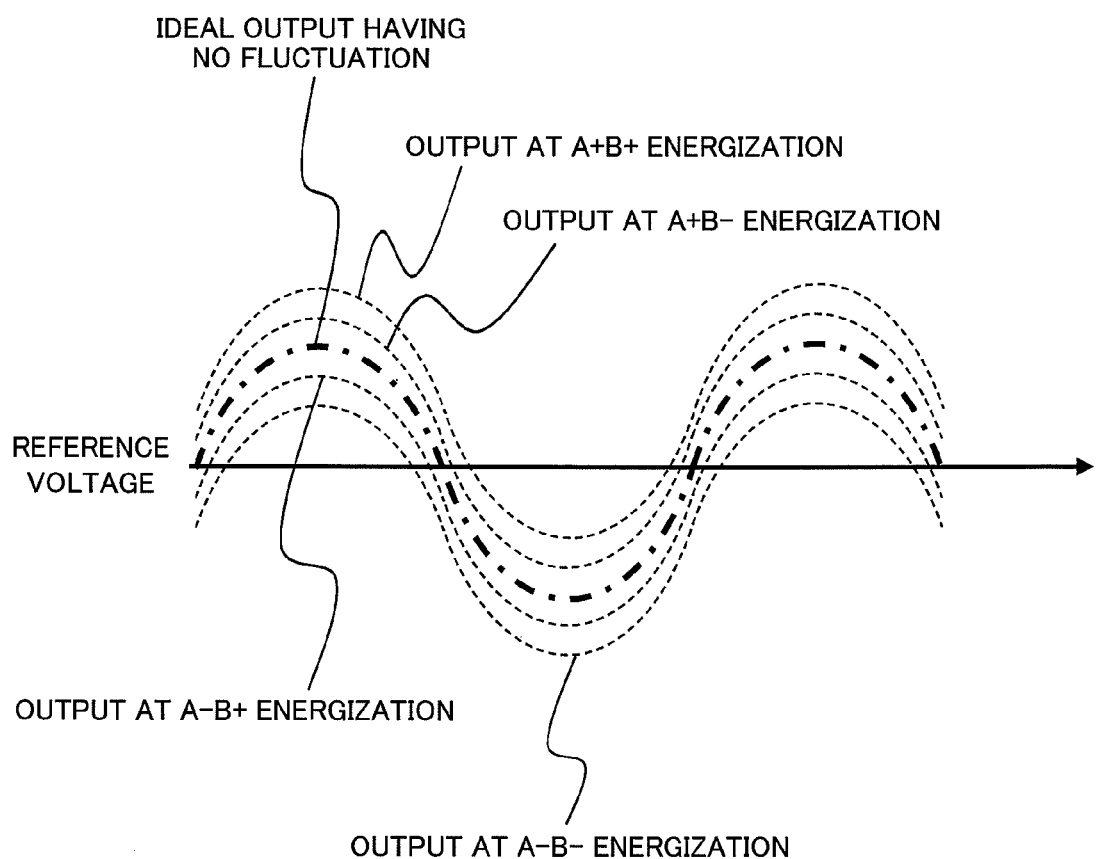
FIG. 11 is a diagram for explaining a change in output voltage of a sensor 5.

Although a rectangular wave obtained by binarizing the output voltage of the sensor is illustrated in FIG. 9, since a Hall device which is used as a sensor 5 has an output voltage which varies in an analog manner, the analog-like output voltage is binarized by a binarization circuit. Each curve in FIG. 11 shows a change in the output voltage of the sensor 5, in which an axis of abscissa indicates a time and an axis of ordinate indicates the output voltage. A curve shown by an alternate long and short dash line in FIG. 11 indicates an output voltage variation of the sensor 5 in a case where the rotor magnet 4 is rotated without being affected by the magnetic fields generated at the A-phase yoke 1 and the B-phase yoke 2. The binarized rectangular wave in FIG. 9 is a wave obtained by binarizing such an analog-like output voltage by using a reference voltage (not shown) as a threshold value.

A curve shown by a broken line to which a notation "A+B+" is allocated in FIG. 11 indicates an output voltage variation of the sensor 5 in a case where the A-phase coil and the B-phase coil are energized in the + (plus) direction, respectively. A curve shown by a broken line to which a notation "A−B+" is allocated in FIG. 11 indicates an output voltage variation of the sensor 5 in a case where the A-phase coil is energized in the − (minus) direction and the B-phase coil is energized in the + (plus) direction, respectively. A curve shown by a broken line to which a notation "A+B−" is allocated in FIG. 11 indicates an output voltage variation of the sensor 5 in a case where the A-phase coil is energized in the + direction and the B-phase coil is energized in the − direction, respectively. A curve shown by a broken line to which a notation "A−B−" is allocated in FIG. 11 indicates an output voltage variation of the sensor 5 in a case where the A-phase coil and the B-phase coil are energized in the − direction, respectively.

In the case of FIG. 11, when the A-phase coil and the B-phase coil are energized in the same direction, the output voltage of the sensor 5 is largely affected. That is, when the A-phase coil and the B-phase coil are energized to A+B+, the output voltage largely fluctuates to the plus side. When they are energized to A−B−, the output voltage fluctuates largely to the minus side. Since the output voltage is more largely affected by the A-phase yoke 1 arranged at the position which is closer to the sensor 5, when they are excited to A+B−, the output voltage fluctuates slightly to the plus side and when they are excited to A−B+, the output voltage fluctuates slightly to the minus side. In this manner, the direction and magnitude of the fluctuation of the output voltage of the sensor 5 differ depending on a combination of the energization directions of the A-phase coil and the B-phase coil and there are four kinds of fluctuation as shown by the broken lines illustrated in FIG. 11.

Figure 12:
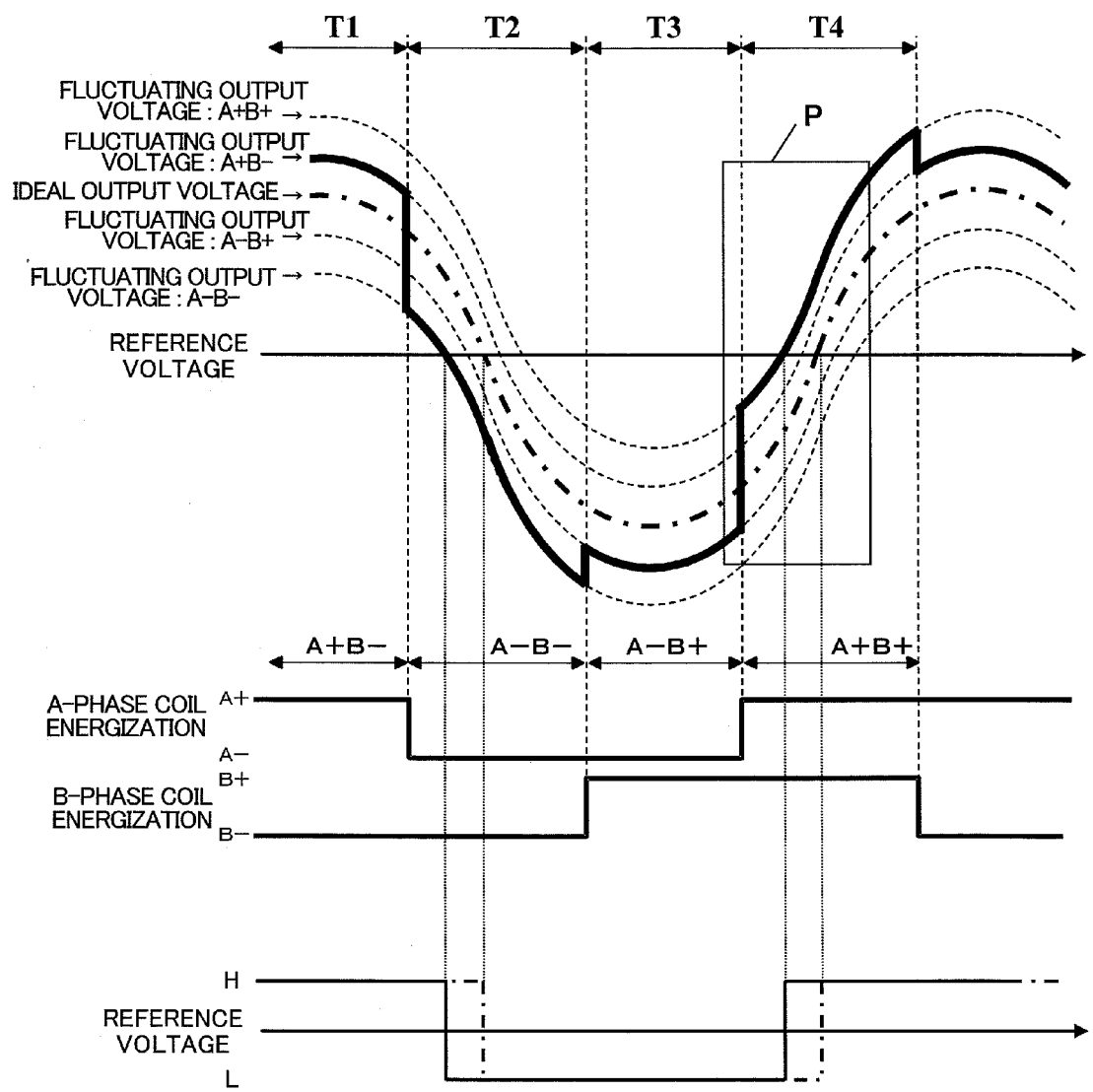
FIG. 12 is a diagram for explaining the change in output voltage of the sensor 5 at the time when the motor is driven.

In the actual motor, since the rotor magnet is rotated while continuously switching the four combinations of excitation of the yokes, the actual output voltage of the sensor fluctuates continuously in four different manners depending on the influence of the excitation of the yokes. FIG. 12 is a diagram for describing the output voltage fluctuation of the sensor 5 at the time when the motor is driven. In a manner similar to FIG. 11, a curve shown in an upper portion in FIG. 12 by an alternate long and short dash line indicates the output voltage of the sensor 5 in a case where the rotor magnet 4 is rotated without being affected by the magnetic fields generated at the A-phase yoke 1 and the B-phase yoke 2, and it is the ideal output voltage showing the correct rotational position of the rotor magnet 4. Total four dotted lines illustrated on the plus side and the minus side of the ideal output voltage indicate the fluctuated output voltages of the sensor 5 in a case where the A-phase coil and the B-phase coil are energized to A+B+, A+B−, A−B+, and A−B−, respectively, in a manner similar to FIG. 11. The reasons why the output voltage fluctuates are as mentioned above. Further, two rectangular waves illustrated in the middle portion in the diagram indicate the energization switching of the A-phase coil and the B-phase coil, respectively. In the diagram, they are energized to A+B−, A−B−, A−B+, and A+B+ in time ranges denoted respectively by T1, T2, T3, and T4 in the diagram.

Thus, the actual output voltage of the sensor changes as shown by a solid line in an upper portion in FIG. 12. That is, in the time range denoted by T1 in the diagram when the A-phase coil and the B-phase coil are energized to A+B−, the output voltage fluctuates slightly from the ideal output voltage to the plus side as shown by the dotted line. However, in the time range denoted by T2 in the diagram when they are energized to A−B−, the output voltage fluctuates largely from the ideal output voltage to the minus side as shown by the dotted line. Similarly, in the time range denoted by T3 in the diagram, the output voltage fluctuates slightly from the ideal output voltage to the minus side as shown by the dotted line. In the time range denoted by T4 in the diagram, the output voltage fluctuates largely from the ideal output voltage to the plus side as shown by the dotted line. In this manner, the output voltage of the sensor 5 always fluctuates depending on the combinations of the energization directions of the coils and the ideal output voltage shown by an alternate long and short dash line is not output. After that, for simplicity of description, a curve shown in an upper portion in FIG. 12 by an alternate long and short dash line indicates the output voltage of the sensor 5 in a case where the rotor magnet 4 is rotated without being affected by the magnetic fields generated at the A-phase yoke 1 and the B-phase yoke 2, and this output voltage is expressed by "ideal output voltage (alternate long and short dash line)". A curve shown in an upper portion in FIG. 12 by a dotted line indicates the output voltage of the sensor 5 which fluctuates in four different manners in a case where the rotor magnet 4 is rotated with being affected by the magnetic fields generated at the A-phase yoke 1 and the B-phase yoke 2, and this output voltage is expressed by "fluctuated output voltage (dotted line)". Further, a curve shown in an upper portion in FIG. 12 by a solid line indicates the actual output voltage of the sensor 5 which is output while it is switched to one of the four fluctuated output voltages (dotted lines) in accordance with the switching of the energization of the A-phase coil and the B-phase coil, and this output voltage is expressed by "actual output voltage (solid line)".

As described above, the sensor 5 outputs only the actual output voltage (solid line) instead of the ideal output voltage (alternate long and short dash line). Therefore, as illustrated in a lower portion in FIG. 12, when the ideal output voltage (alternate long and short dash line) is binarized, it becomes a rectangular wave shown by an alternate long and short dash line in the diagram. However, when the actual output voltage (solid line) is binarized, it becomes a rectangular wave shown by a solid line in the diagram. Thus, the correct rotational position of the rotor magnet cannot be obtained and the proper driving control cannot be attained in this state.

The exemplary embodiments of the present invention will be described hereinbelow with reference to the accompanying drawings. Although an example in the case where the invention is applied to the motor illustrated in FIG. 10 will be described hereinbelow, the invention is not limited to it. Naturally, the invention can be also applied to another motor having the above-described problem of the related art, which lies in relationship between the position detection of the rotor magnet and the excitation timing of the yoke. That is, the present invention is an invention which can be used in the driving apparatus having the detection unit for detecting the rotational position of the rotor magnet.

First Embodiment

Figure 1:
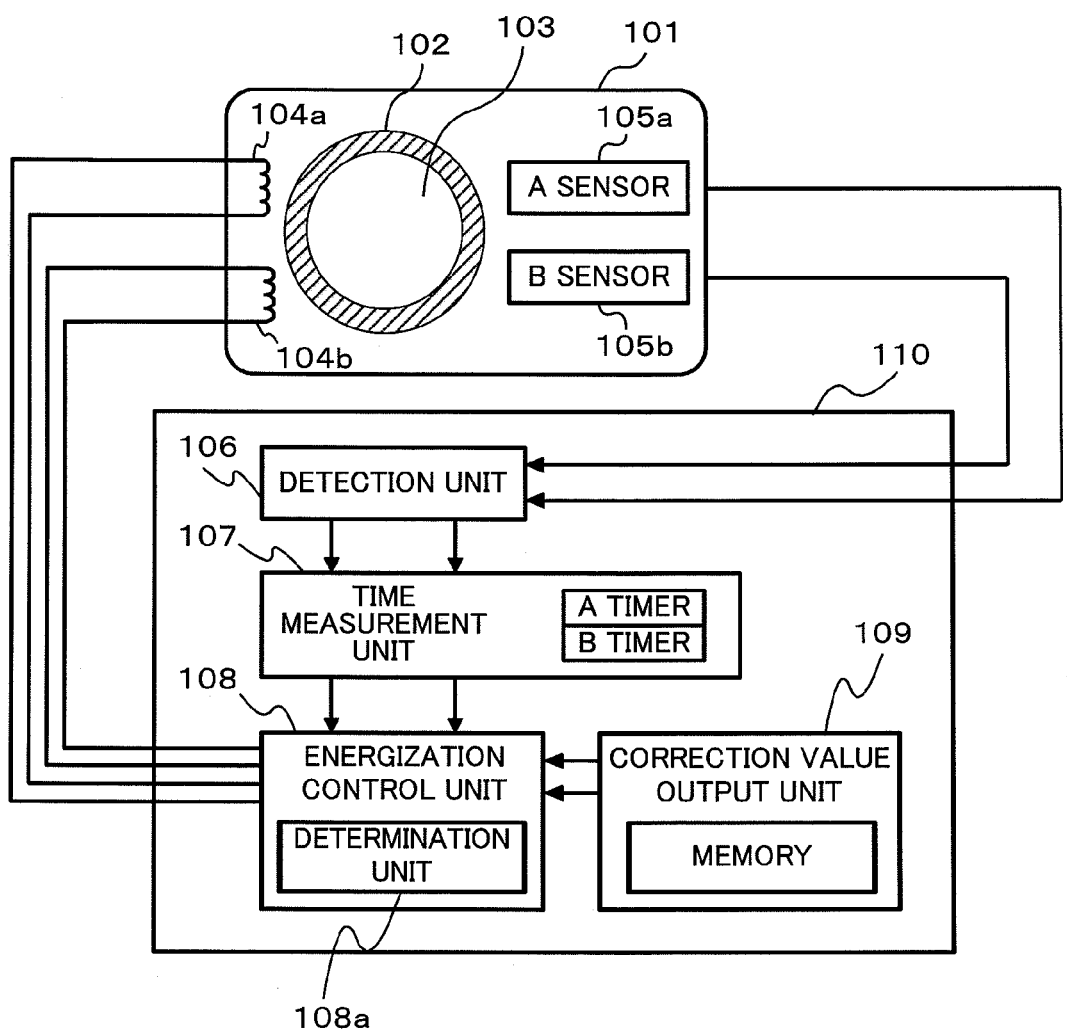
FIG. 1 is a block diagram illustrating a driving apparatus according to the first embodiment of the invention.

FIG. 1 is a block diagram of the driving apparatus according to the first embodiment. The driving apparatus of the first embodiment is constructed by a motor 101 and a motor control circuit 110 for controlling the motor 101. The motor 101 in the embodiment is a stepper motor and can be applied to, for example, a motor for driving a zoom lens of an image pickup apparatus.

The motor 101 is constructed by a rotor 103, an A-phase coil 104a (first coil), a B-phase coil 104b (second coil), an A sensor 105a, and a B sensor 105b. A cylindrical magnet 102 is fixed to the rotor 103. Different magnetic poles (a north pole and a south pole) are alternately magnetized on a peripheral surface of the magnet 102 in a circumferential direction. As each of the A sensor 105a and the B sensor 105b, a Hall device whose output voltage changes in an analog manner depending on a magnetic flux which passes through the Hall device is used. The A sensor 105a and the B sensor 105b are arranged oppositely to the north and south poles magnetized on the peripheral surface of the magnet 102, so that a rotation of the rotor 103 induces an analogue variation of the output voltages of the sensors.

That is, the A sensor 105a functions as a first detection unit for alternately detecting the magnetic poles (the north pole and the south pole) of the rotor 103 and outputting a signal when the rotor 103 is rotated. The B sensor 105b functions as a second detection unit for alternately detecting the magnetic poles (the north pole and the south pole) of the rotor 103 and outputting a signal of a phase different from that of the signal which is output from the A sensor 105a when the rotor 103 is rotated. The motor control circuit 110 is constructed by a detection unit 106, a time measurement unit 107, and an energization control unit 108.

The detection unit 106 binarizes the analog-like voltage signals which are output from the A sensor 105a and the B sensor 105b into two values H and L and outputs rectangular waves, respectively.

The time measurement unit 107 measures a time which is required from after the rectangular wave which is output from the detection unit 106 is H/L inverted until an H/L inversion happens. The time measurement unit 107 has an A timer and a B timer which can independently measure and output the time. The A timer measures and outputs a time A which is required from after the rectangular wave of the A sensor 105a is H/L inverted until an H/L inversion happens. The B timer measures and outputs a time B which is required from after the rectangular wave of the B sensor 105b is H/L inverted until an H/L inversion happens.

That is, the time measurement unit 107 functions as a time measurement unit for measuring a time, as a first time, which is required from after the A sensor 105a detects the first magnetic pole of the rotor 103 until the A sensor 105a detects a second magnetic pole (for example, a south pole) different from a first magnetic pole (for example, a north pole) of the rotor 103. The time measurement unit 107 also functions as a time measurement unit for measuring a time, as a second time, which is required from after the B sensor 105b detects the first magnetic pole (for example, the north pole) until the B sensor 105b detects the second magnetic pole (for example, the south pole).

The energization control unit 108 controls energization switching timing of the A-phase coil 104a and the B-phase coil 104b on the basis of the elapse times (from the H/L inversion of the A sensor 105a and the B sensor 105b) which are measured by the time measurement unit 107. The energization control unit 108 has a determination unit 108a for discriminating whether or not the H/L inversion has happened in the A sensor 105a or the B sensor 105b substantially at the same time as the energization switching of the A-phase coil 104a and the B-phase coil 104b.

A correction value output unit 109 has a memory. Correction values for correcting differences between the ideal output voltages and the actual output voltages of the sensors 105a and 105b are stored in the memory. The energization control unit 108 corrects the differences between the ideal output voltages and the actual output voltages of the sensors 105a and 105b on the basis of the correction values which are output from the correction value output unit 109.

That is, the energization control unit 108 corrects the differences between the outputs from the sensors 105a and 105b obtained when the coils 104a and 104b are not energized and the outputs from the sensors 105a and 105b obtained when the coils 104a and 104b are energized.

Figure 4A:
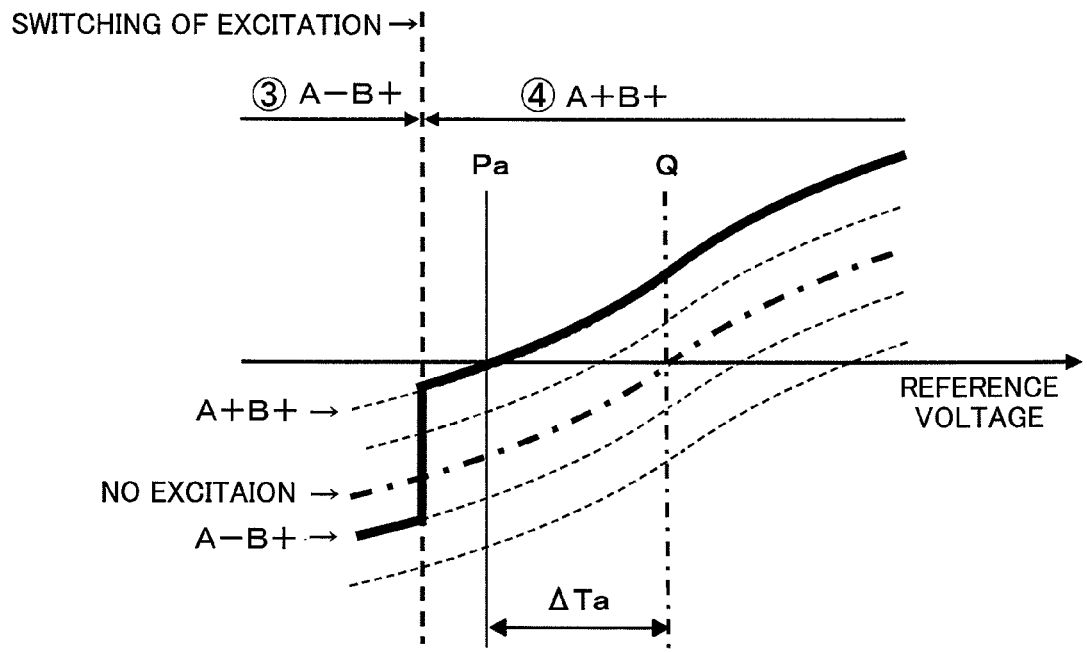
FIG. 4A is a diagram enlargedly illustrating output voltages of sensors in a boundary portion (shown by P) between a time range denoted by T3 and a time range denoted by T4 in FIG. 12.
Figure 4B:
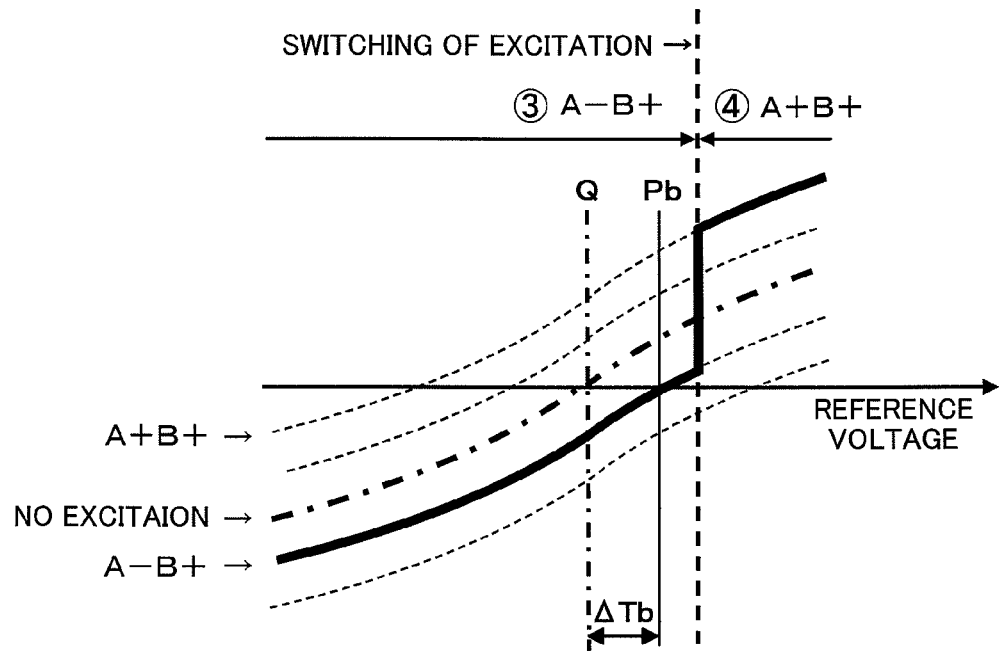
FIG. 4B is a diagram enlargedly illustrating output voltages of sensors in a boundary portion (denoted by P) between a time range shown by T3 and a time range denoted by T4 in FIG. 12.

FIGS. 4A and 4B are diagrams enlargedly illustrating the output voltages of the sensors in a boundary portion (denoted by P in the diagram) between the time range denoted by T3 and the time range denoted by T4 in FIG. 12. Meanings of an alternate long and short dash line, a dotted line, and a solid line are similar to those described in FIG. 12. However, FIG. 4A is a diagram in a case where the actual output voltage (solid line) occurs in the time range denoted by T3 where a threshold value becomes the reference voltage (hereinbelow, abbreviated to "zero-crossing"). FIG. 4B is a diagram in a case where the actual output voltage (solid line) occurs in the time range denoted by T4. In FIGS. 4A and 4B, each of notations Pa and Pb indicates an occurrence point of the zero-crossing of the actual output voltage (solid line), and a notation Q indicates an occurrence point of the zero-crossing of the ideal output voltage (alternate long and short dash line). Since $\Delta Ta$ as a difference between Q and Pa illustrated in FIG. 4A and $\Delta Tb$ as a difference between Q and Pb illustrated in FIG. 4B are equal to fixed values, they have previously been stored in the memory of the correction value output unit 109. The correction value output unit 109 outputs the correction values $\Delta Ta$ and $\Delta Tb$ to the energization control unit 108. Thus, the energization control unit 108 can indirectly obtain the timing of Q by making time correction of $\Delta Ta$ and $\Delta Tb$ to the timings of Pa and Pb and can obtain the correct rotational position of the rotor magnet.

When the zero-crossing occurs in the time range denoted by T4 in the diagram as illustrated in FIG. 4A, a time obtained by adding ΔTa to the time Pa of the zero-crossing of the actual output voltage (solid line) is regarded as a time Q of the zero-crossing of the ideal output voltage (alternate long and short dash line). The energization switching timing of the A-phase coil 104*a* and the B-phase coil 104*b* is controlled on the basis of the time obtained by adding ΔTa to the time Pa of the zero-crossing of the actual output voltage (solid line). When the zero-crossing occurs in the time range denoted by T3 in the diagram as illustrated in FIG. 4B, a time obtained by subtracting ΔTb from the time Pb of the zero-crossing of the actual output voltage (solid line) is regarded as a time Q of the zero-crossing of the ideal output voltage (alternate long and short dash line). The energization switching timing of the A-phase coil 104*a* and the B-phase coil 104*b* is controlled on the basis of the time obtained by subtracting ΔTb from the time Pb of the zero-crossing of the actual output voltage (solid line).

Figure 5:
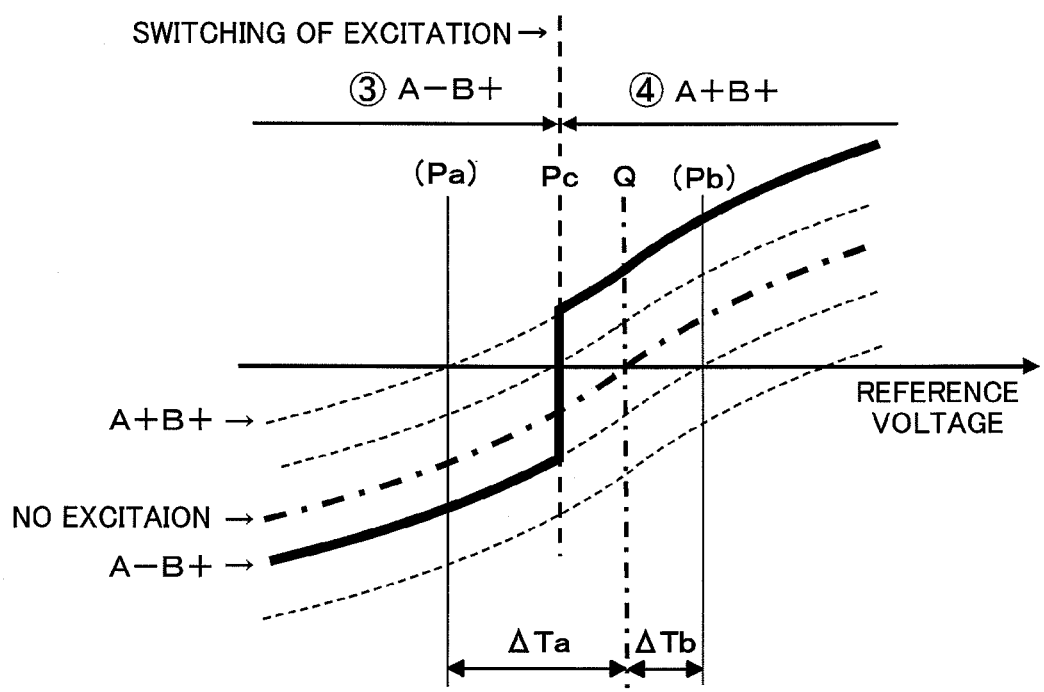
FIG. 5 is a diagram enlargedly illustrating output voltages of the sensors in the boundary portion (denoted by P) between the time range shown by T3 and the time range denoted by T4 in FIG. 12.

FIG. 5 is a diagram enlargedly illustrating the output voltages of the sensors in the boundary portion between the time range denoted by T3 and the time range denoted by T4 in FIG. 12 in a manner similar to FIGS. 4A and 4B. Meanings of an alternate long and short dash line, a dotted line, and a solid line are similar to those described in FIGS. 12, 4A, and 4B. In FIG. 5, a notation Pc indicates an occurrence point of the zero-crossing of the actual output voltage (solid line) and a notation Q indicates an occurrence point of the zero-crossing of the ideal output voltage (alternate long and short dash line). A notation Pa indicates an occurrence point of the zero-crossing in a case where the time ranges T3 and T4 are set into the energization pattern of A+B+. A notation Pb indicates an occurrence point of the zero-crossing in a case where the time ranges T3 and T4 are set into the energization pattern of A−B+.

A difference between FIGS. 5 and 4A and 4B is that the zero-crossing of the actual output voltage (solid line) occurs on a boundary between the time range denoted by T3 and the time range denoted by T4 in FIG. 12, that is, the zero-crossing occurs at the same time as the energization switching from A−B+ to A+B+. In the case where the zero-crossing occurs after the energization switching of the coil as illustrated in FIG. 4A, by adding ΔTa to the time Pa of the zero-crossing of the actual output voltage (solid line), the time Q of the zero-crossing of the ideal output voltage (alternate long and short dash line) can be obtained. Similarly, even in the case where the zero-crossing occurs before the energization switching of the coil as illustrated in FIG. 4B, by subtracting ΔTb from the time Pb of the zero-crossing of the actual output voltage (solid line), the time Q of the zero-crossing of the ideal output voltage (alternate long and short dash line) can be obtained.

However, in FIG. 5, the zero-crossing occurs due to the energization switching of the coil. As mentioned above, ΔTa (=from Pa to Q) or ΔTb (=from Pb to Q) as a difference between the zero-crossing of the fluctuated output voltage (dotted line) and the zero-crossing of the ideal output voltage (alternate long and short dash line) is equal to a fixed value as mentioned above. However, a difference (=from Pc to Q) between the zero-crossing of the actual output voltage (solid line) and the zero-crossing of the ideal output voltage (alternate long and short dash line) is equal to a value which varies depending on the point of time when the energization patterns of the coils is switched. Therefore, in the case of FIG. 9, according to the foregoing time correction, the time Q of the zero-crossing of the ideal output voltage (alternate long and short dash line) cannot be obtained.

Figure 2:
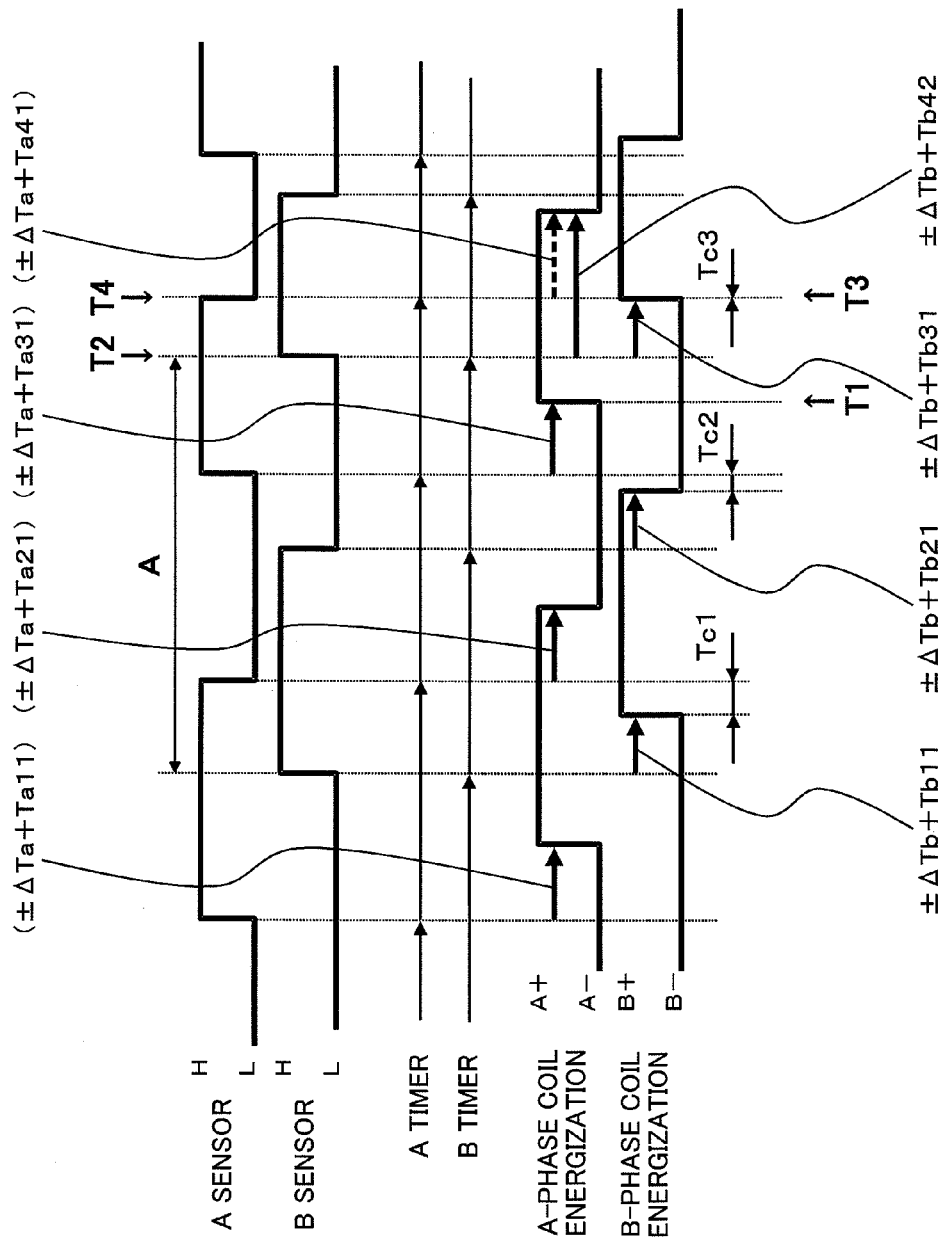
FIG. 2 is a timing chart at the time when a motor is controlled acceleratedly in the driving apparatus according to the first embodiment.

FIG. 2 is a timing chart at the time when the motor 101 is controlled accelerated in the driving apparatus according to the first embodiment. As illustrated in FIG. 2, the energization switching of the A-phase coil 104*a* is performed after the first elapse time (±ΔTa+Ta11)~(±ΔTa+Ta31) elapses from the H/L inversion of the A sensor 105*a*. Similarly, the energization switching of the B-phase coil 104*b* is performed after the first elapse time (±ΔTb+Tb11)~(±ΔTb+Tb31) elapses from the H/L inversion of the B sensor 105*b*. That is, the energization switching of the A-phase coil 104*a* is performed at the timing when the elapse time (after the rectangular wave of the A sensor 105*a* is H/L inverted) which is output from the time measurement unit 107 is equal to (±ΔTa+Ta11)~(±ΔTa+Ta31). The energization switching of the B-phase coil 104*b* is performed at the timing when the elapse time (after the rectangular wave of the B sensor 105*b* is H/L inverted) which is output from the time measurement unit 107 is equal to (±Tb+Tb11)~(±Tb+Tb31).

Each of (±ΔTa) and (±ΔTb) as a first term of the first elapse time is a correction time term which is given by the above-described time correction. That is, it is a correction term for correcting the actual output voltage (solid line) of the sensor to the ideal output voltage (alternate long and short dash line). As described with reference to FIGS. 4A and 4B, the above correction term has a positive sign in the case of an additional correction and has a negative sign in the case of a subtractive correction. Each of (+Ta11)~(+Ta31) and (+Tb11)~(+Tb31) as a second term of the first elapse time is a time term which specifies a timing relation between the rotational position of the magnet 102 and the energization switching of the coil. A rotation speed of the motor is controlled by controlling a value of such a time term. That is, according to the motor of the present embodiment, the output voltages of the sensors are binarized, and the rotational position of the magnet 102 is detected from the level inversion of the binarized output signals of the sensors, thereby controlling and the energization switching of the coil.

It is now assumed that each of (+Ta11)~(+Ta31) and (+Tb11)~(+Tb31) as a second term of the first elapse time which is required until the energization switching from the H/L inversion of the sensors is controlled to be constant by a proper value. Thus, a relation between the rotational position of the magnet 102 and the energization switching timing of the coil becomes constant. If a load which is applied to the motor is constant, the rotation speed can be controlled to be constant. However, if each of (+Ta11)~(+Ta31) and (+Tb11)~(+Tb31) as a second term of the first elapse time is controlled so as to be decreased step by step, the energization switching timing of the coil is made earlier step by step to the rotational position of the magnet 102. In this case, if the load which is applied to the motor is constant, the rotation speed of the motor can be accelerated.

As mentioned above, by reducing each of (+Ta11)~(+Ta31) and (+Tb11)~(+Tb31) as a second term of the first elapse time, the motor is accelerated. In the acceleration step, as illustrated in FIG. 2, the times Tc1 to Tc3 which are required until the H/L inversion of the A sensor 105*a* happens after the energization switching of the B-phase coil 104*b* are gradually shortened and soon become substantially the same time. That is, the reason why the H/L inversion of the A sensor 105*a* happens at the timing shown by an arrow T4 in FIG. 2 is that the energization switching of the B-phase coil 104*b* is performed at the timing shown by an arrow T3 in FIG. 2. As mentioned above, in the H/L inversion of the sensor which happened due to the energization switching of the coil, the time of the zero-crossing of the ideal output voltage (alternate long and short dash line) can be obtained by the foregoing time correction.

In the first embodiment, the following control is made in consideration of such a case.

Figure 3:
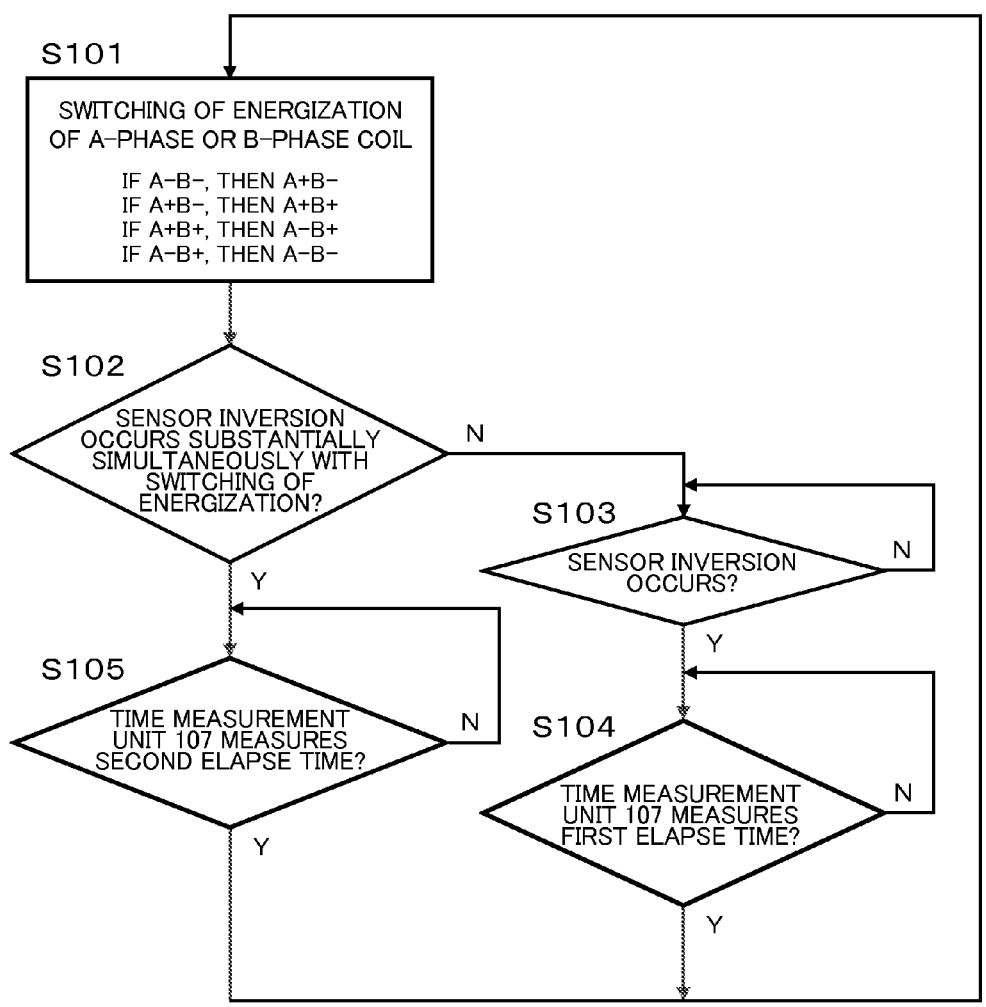
FIG. 3 is a flowchart for describing the motor driving control operation.

FIG. 3 is a flowchart for the motor driving control operation according to the first embodiment.

In step S101, the energization switching of the A-phase coil 104a and the B-phase coil 104b is performed by the energization control unit 108.

In step S102, whether or not the H/L inversion happens in the A sensor 105a or the B sensor 105b substantially simultaneously with the energization switching of the A-phase coil 104a and the B-phase coil 104b is discriminated by the energization control unit 108. If the H/L inversion happened in the A sensor 105a or the B sensor 105b substantially simultaneously with the energization switching of the A-phase coil 104a and the B-phase coil 104b, the processing routine advances to step S105. If the H/L inversion does not happen in the A sensor 105a or the B sensor 105b substantially simultaneously with the energization switching of the A-phase coil 104a and the B-phase coil 104b, step S103 follows.

In step S103, whether or not the H/L inversion happens in the A sensor 105a or the B sensor 105b is discriminated by the energization control unit 108. If the H/L inversion happens in the A sensor 105a or the B sensor 105b, step S104 follows. If the H/L inversion does not happen in the A sensor 105a or the B sensor 105b, step S103 is repeated.

In step S104, whether or not the time A which is measured by the A timer of the time measurement unit 107 from after the H/L inversion happened in the A sensor 105a is equal to the first elapse time is discriminated by the energization control unit 108. If the time A is equal to the first elapse time, step S101 follows. If the time A is not equal to the first elapse time, step S104 is repeated. Similarly, if the H/L inversion happens in the B sensor 105b in step S103, whether or not the time B which is measured by the B timer of the time measurement unit 107 from after the H/L inversion happens in the B sensor 105b is equal to the first elapse time is discriminated. If the time B is equal to the first elapse time, step S101 follows. If the time B is not equal to the first elapse time, step S104 is repeated.

In step S105, whether or not the time B which is measured by the B timer of the time measurement unit 107 from after the H/L inversion happens in the B sensor 105b is equal to the second elapse time is discriminated by the energization control unit 108. If the time B is equal to the second elapse time, step S101 follows. If the time B is not equal to the second elapse time, step S105 is repeated. Similarly, if it is determined in step S102 that the H/L inversion happens in the B sensor 105b, whether or not the time A which is measured by the A timer of the time measurement unit 107 from after the H/L inversion happens in the A sensor 105a is equal to the second elapse time is discriminated. If the time A is equal to the second elapse time, step S101 follows. If the time A is not equal to the second elapse time, step S105 is repeated.

In the first embodiment, if the H/L inversion happens in the A sensor 105a substantially simultaneously with the energization switching of the A-phase coil 104a and the B-phase coil 104b, the energization switching based on the time A which is measured from after the H/L inversion happens in the A sensor 105a is not performed. In place of it, the energization switching based on the time B which is measured from after the H/L inversion happens in the B sensor 105b is performed. Similarly, if the H/L inversion happens in the B sensor 105b substantially simultaneously with the energization switching of the A-phase coil 104a and the B-phase coil 104b, the energization switching based on the time B which is measured from after the H/L inversion happens in the B sensor 105b is not performed. In place of it, the energization switching based on the time A which is measured from after the H/L inversion happens in the A sensor 105a is performed.

That is, if the H/L inversion does not happen in the A sensor 105a substantially simultaneously with the energization switching of the A-phase coil 104a and the B-phase coil 104b, the foregoing time correction can be made to the time A which is measured from after the H/L inversion happens in the A sensor 105a. However, if the H/L inversion happens in the A sensor 105a substantially simultaneously with the energization switching of the A-phase coil 104a and the B-phase coil 104b, the foregoing time correction cannot be made to the time A which is measured from after the H/L inversion happens in the A sensor 105a. This is also true of the B sensor 105b.

The time measurement unit 107 independently measures the time A which is required from after the rectangular wave of the A sensor 105a is H/L inverted until the H/L inversion happens again and the time B which is required from after the rectangular wave of the B sensor 105b is H/L inverted until the H/L inversion happens again and independently outputs them. Therefore, if the H/L inversion happens in the A sensor 105a substantially simultaneously with the energization switching, control based on the time B which is required from after the H/L inversion happens in the B sensor 105b can be made. Similarly, if the H/L inversion happens in the B sensor 105b substantially simultaneously with the energization switching, control based on the time A which is required from after the H/L inversion happens in the A sensor 105a can be made.

A case where the operation of the flowchart of FIG. 3 is started from the timing shown by an arrow T1 in FIG. 2 will be described as an example.

The energization switching from A−B− to A+B− is performed at the timing shown by the arrow T1 in FIG. 2, and step S102 follows.

At the timing shown by the arrow T1 in FIG. 2, since the H/L inversion does not happen substantially simultaneously with the energization switching of the A sensor 105a and the B sensor 105b, a discrimination result in step S102 is NO and step S103 follows.

Step S103 is repeated until the H/L inversion happens in the B sensor 105b at the timing shown by the arrow T2 in FIG. 2 and step S104 follows.

Step S104 is repeated until the time B measured by the B timer of the time measurement unit 107 is equal to the first elapse time (±ΔTb+Tb31). When the time B measured by the B timer of the time measurement unit 107 is equal to the first elapse time (±ΔTb+Tb31), the processing routine advances to step S101.

In step S101, the energization switching from A+B− to A+B+ is performed at the timing shown by the arrow T3 in FIG. 2. At this time, the H/L inversion happens in the A sensor 105a at the timing shown by the arrow T4 in FIG. 2 that is substantially the same as the timing shown by the arrow T3 in FIG. 2. Therefore, in next step S102, it is determined that the energization switching and the H/L inversion of the A sensor 105a happens substantially simultaneously. The processing routine advances to step S105.

In step S105, step S104 is repeated until the time B which is measured by the B timer of the time measurement unit 107 from after the H/L inversion happens in the B sensor 105b is equal to the second elapse time (±ΔTb+Tb42). When the time B measured by the B timer of the time measurement unit 107 is equal to the second elapse time (±ΔTb+Tb42), the processing routine advances to step S101 again. That is, If the energization switching and the H/L inversion of the A sensor 105a happens substantially simultaneously, the energization switching of the A-phase coil 104a is not performed on the basis of the time A which is measured from after the H/L inversion happens in the A sensor 105a. In place of it, the energization switching of the A-phase coil 104a is performed on the basis of the time B which is measured from after the H/L inversion happens in the B sensor 105b.

The second term (Ta41) of the first elapse time is a value which is preset in accordance with a target rotation speed of the motor or the load which is applied to the motor. On the other hand, the second term (Tb42) of the second elapse time can be calculated by adding the correction time to the second term (Ta41) of the first elapse time.

The correction time can be calculated by the following equation.

(Correction time)=(second term (Tb42) of the second elapse time)−(second term (Ta41) of the first elapse time)=(time(denoted by A in the diagram) corresponding to current electrical degree 360°)× ((corresponding electrical degree of deviation amount between A sensor and B sensor)÷360°)

Therefore, in the first embodiment, if the H/L inversion happens in the A sensor 105a substantially simultaneously with the energization switching, the energization switching based on the H/L inversion of the A sensor 105a as a reference is not performed. Thus, the energization switching can be performed based on the H/L inversion of the sensor in which the time of the zero-crossing of the ideal output voltage (alternate long and short dash line) can be obtained by the foregoing time correction.

Further, in the first embodiment, if the H/L inversion of the A sensor 105a happens substantially simultaneously with the energization switching, the energization switching is performed based on the H/L inversion of the B sensor 105b, as a reference, in which the H/L inversion happens at the timing that is closest to the H/L inversion of the A sensor 105a. Thus, the proper control can be made.

Second Embodiment

In the first embodiment, the time measurement unit 107 measures the elapse time which is required from after the rectangular wave which is output from the detection unit 106 is H/L inverted until the H/L inversion happens. On the other hand, the second embodiment differs from the first embodiment with respect to a time which is measured by a time measurement unit 207.

The time measurement unit 207 measures and outputs an elapse time which is required from after the rectangular wave is inverted from H to L until the rectangular wave which is output from the detection unit 106 is inverted from H to L again. Similarly, the time measurement unit 207 measures and outputs an elapse time which is required after the rectangular wave is inverted from L to H until the rectangular wave which is output from the detection unit 106 is inverted from L to H again. The time measurement unit 207 has an A1 timer, an A2 timer, a B1 timer, and a B2 timer which can independently measure and output the times.

That is, as an A1 timer, the time measurement unit 207 measures and outputs a time A1 which is required from after the rectangular wave is inverted from H to L until the rectangular wave of the A sensor 105a is inverted from H to L again. At the same time, as an A2 timer, the time measurement unit 207 measures and outputs a time A2 which is required from after the rectangular wave is inverted from L to H until the rectangular wave of the A sensor 105a is inverted from L to H again. Simultaneously with it, as a B1 timer, the time measurement unit 207 measures and outputs a third time which is required from after the rectangular wave is inverted from H to L until the rectangular wave of the B sensor 105b is inverted from H to L again. Further, at the same time, as a B2 timer, the time measurement unit 207 measures and outputs a fourth time which is required from after the rectangular wave is inverted from L to H until the rectangular wave of the B sensor 105b is inverted from L to H again. Therefore, the time measurement unit 207 executes the four kinds of independent time measurement and outputs the four independent measurement times to an energization control unit 208.

Therefore, the time measurement unit 207 measures a time which is required from after the A sensor 105a detects the first magnetic pole (for example, the north pole) of the rotor 103 until the A sensor 105a detects the first magnetic pole (for example, the north pole) of the rotor 103. The time measurement unit 207 also measures a time which is required after the A sensor 105a detects the second magnetic pole (for example, the south pole) of the rotor 103 until the A sensor 105a detects the second magnetic pole (for example, the south pole) of the rotor 103. The time measurement unit 207 also measures a time which is required from after the B sensor 105b detects the first magnetic pole (for example, the north pole) of the rotor 103 until the B sensor 105b detects the first magnetic pole (for example, the north pole) of the rotor 103. Further, the time measurement unit 207 measures a time which is required from after the B sensor 105b detects the second magnetic pole (for example, the south pole) of the rotor 103 until the B sensor 105b detects the second magnetic pole (for example, the south pole) of the rotor 103.

Figure 6:
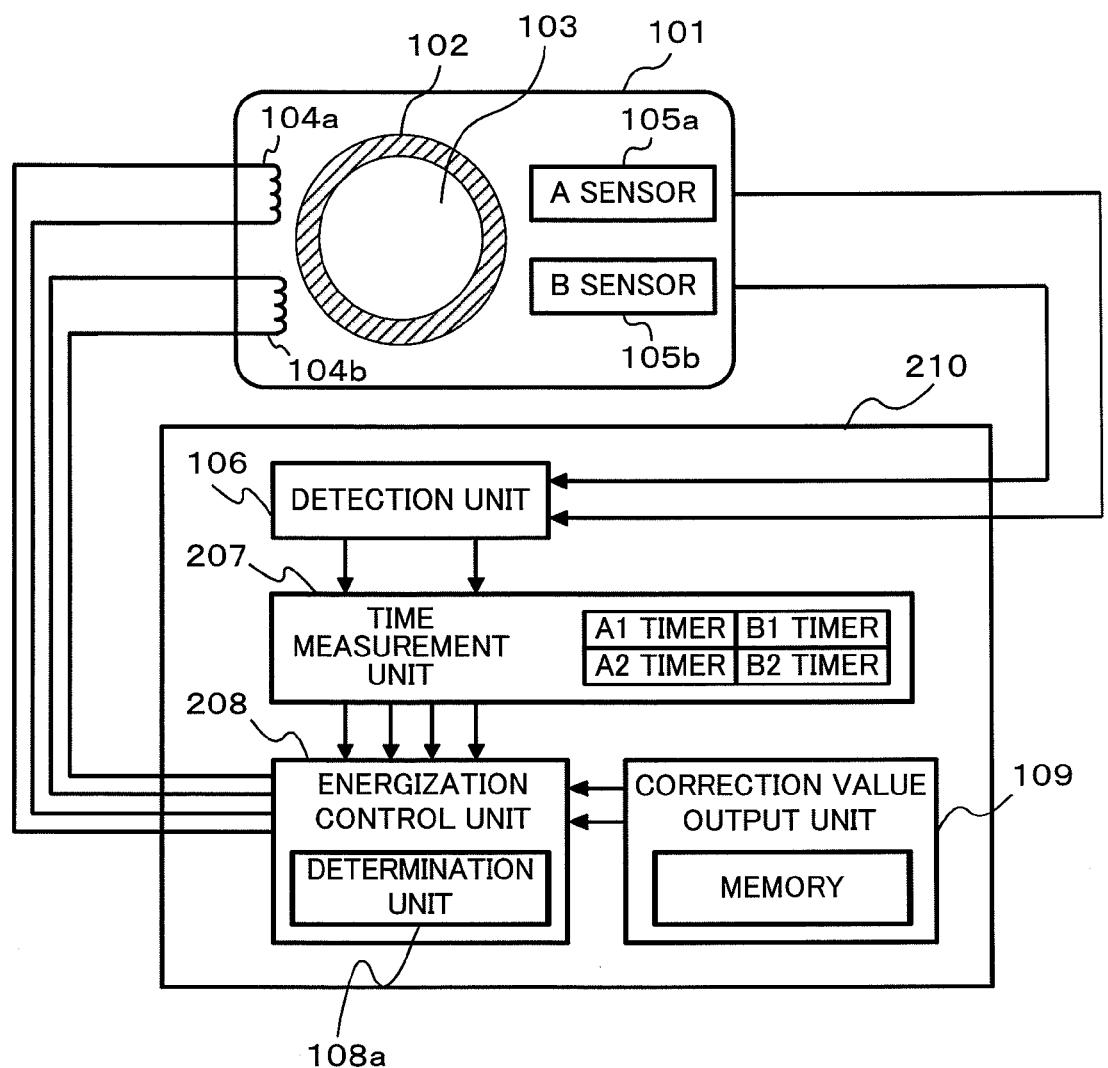
FIG. 6 is a block diagram of a driving apparatus according to the second embodiment of the invention.

FIG. 6 is a block diagram of a driving apparatus according to the second embodiment. The driving apparatus according to the second embodiment is constructed by the motor 101 and a motor control circuit 210 for controlling the motor 101. Portions similar to those in the first embodiment will be denoted by the same reference numerals as those in the first embodiment and their description is omitted here.

Figure 7:
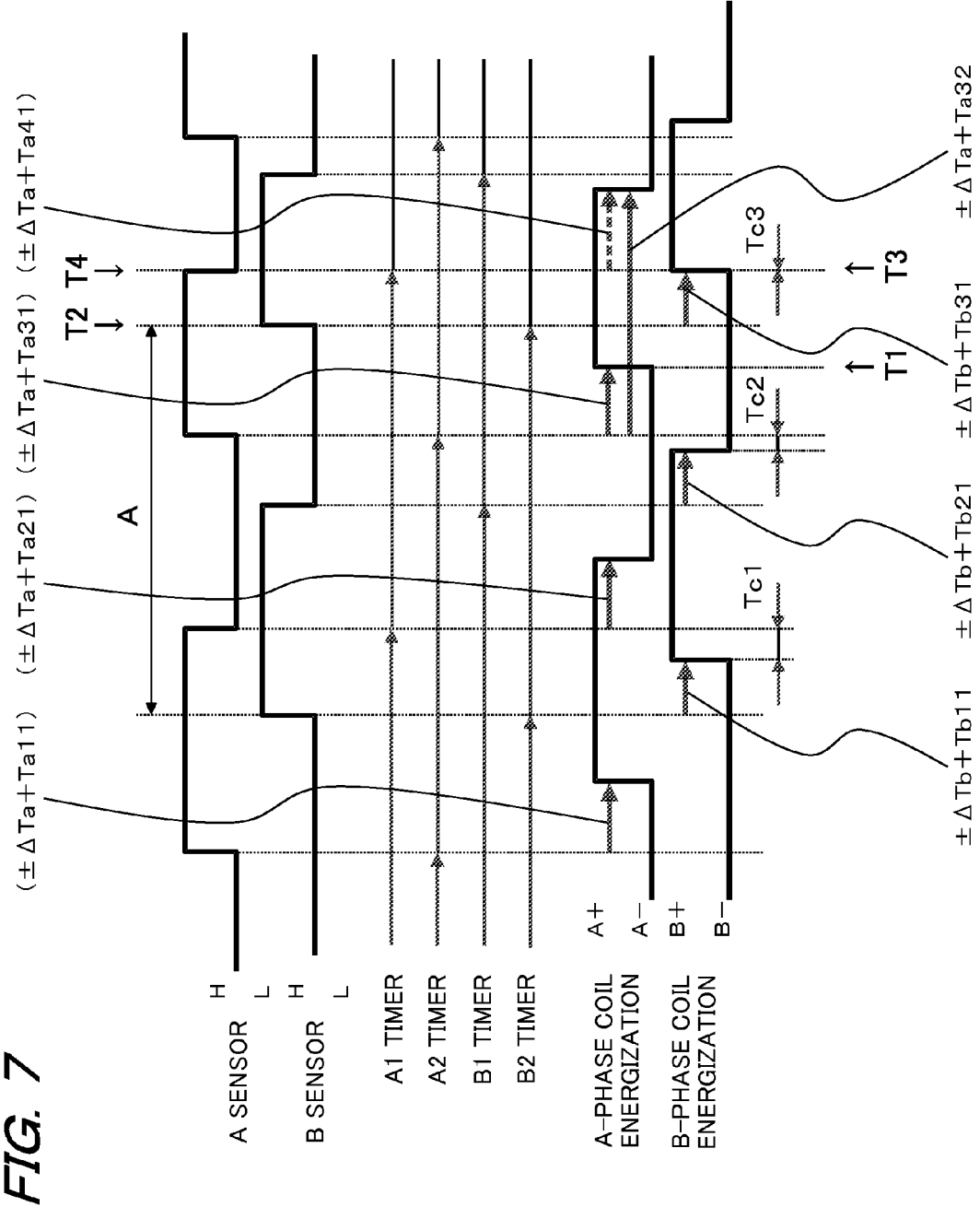
FIG. 7 is a timing chart at the time when the motor is controlled acceleratedly in the driving apparatus according to the second embodiment of the invention.
Figure 8:
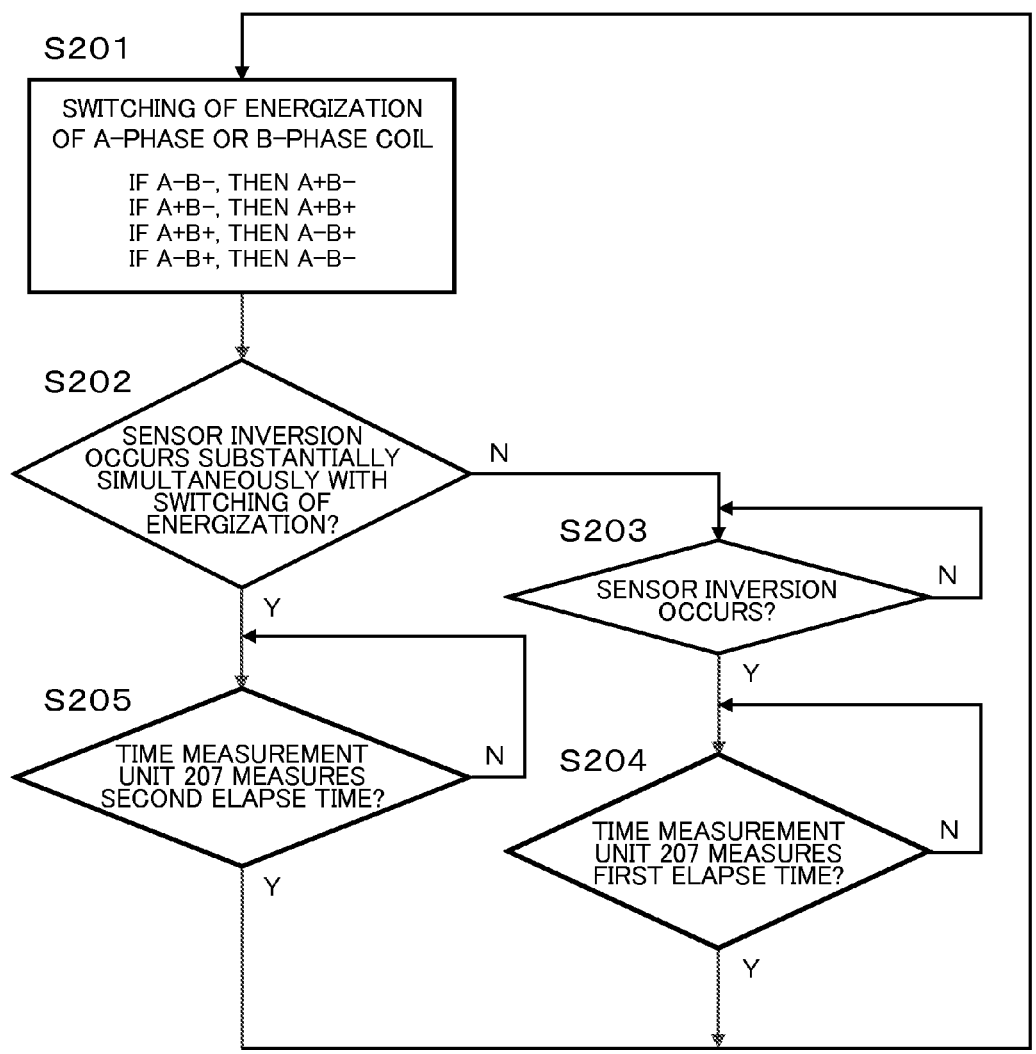
FIG. 8 is a flowchart for the motor driving control operation.

FIG. 7 is a timing chart at the time when the motor 101 is controlled acceleratedly in the driving apparatus according to the second embodiment. FIG. 8 is a flowchart for describing the motor driving control operation according to the second embodiment.

In step S201, the energization switching of the A-phase coil 104a and the B-phase coil 104b is performed by the energization control unit 208.

In step S202, whether or not the H/L inversion happens in the A sensor 105a or the B sensor 105b substantially at the same time as the energization switching of the A-phase coil 104a and the B-phase coil 104b is discriminated by the energization control unit 208. If the H/L inversion happens in the A sensor 105a or the B sensor 105b substantially at the same time as the energization switching of the A-phase coil 104a and the B-phase coil 104b, step S205 follows. If the H/L inversion does not happen in the A sensor 105a or the B sensor 105b substantially at the same time as the energization switching of the A-phase coil 104a and the B-phase coil 104b, step S203 follows.

In step S203, if the energization direction of the A-phase coil 104a is +, whether or not the rectangular wave of the A sensor 105a is inverted from H to L is discriminated by the energization control unit 208. Step S203 is repeated until it is inverted from H to L. Similarly, if the energization direction of the A-phase coil 104a is −, whether or not the rectangular wave of the A sensor 105a is inverted from L to H is discriminated. Step S203 is repeated until it is inverted from L to H. If the energization direction of the B-phase coil 104b is +, whether or not the rectangular wave of the B sensor 105b is inverted from H to L is discriminated. Step S203 is repeated until it is inverted from H to L. If the energization direction of the B-phase coil 104b is −, whether or not the rectangular wave of the B sensor 105b is inverted from L to H is discriminated. Step S203 is repeated until it is inverted from L to H.

In step S204, if the energization direction of the A-phase coil 104a is +, whether or not the time A1 which is measured by the A1 timer of the time measurement unit 207 from after the rectangular wave of the A sensor 105a is inverted from H to L is equal to the first elapse time is discriminated by the energization control unit 208. Step S204 is repeated until the time A1 is equal to the first elapse time. Similarly, if the energization direction of the A-phase coil 104a is −, whether or not the time A2 which is measured by the A2 timer of the time measurement unit 207 from after the rectangular wave of the A sensor 105a is inverted from L to H is equal to the first elapse time is discriminated. Step S204 is repeated until the time A2 is equal to the first elapse time. If the energization direction of the B-phase coil 104b is +, whether or not the third time which is measured by the B1 timer of the time measurement unit 207 after the rectangular wave of the B sensor 105b was inverted from H to L is equal to the first elapse time is discriminated. Step S204 is repeated until the third time is equal to the first elapse time. If the energization direction of the B-phase coil 104b is −, whether or not the fourth time which is measured by the B2 timer of the time measurement unit 207 from after the rectangular wave of the B sensor 105b is inverted from L to H is equal to the first elapse time is discriminated. Step S204 is repeated until the fourth time is equal to the first elapse time.

In step S205, the following discrimination is made by the energization control unit 208. That is, if it is determined in step S202 that the inversion from H to L happens in the A sensor 105a, whether or not the time A2 which is measured by the A2 timer of the time measurement unit 207 from after the inversion from L to H happens in the A sensor 105a is equal to the second elapse time is discriminated by the energization control unit 208. Similarly, if it is determined in step S202 that the inversion from L to H happens in the A sensor 105a, whether or not the time A1 which is measured by the A1 timer of the time measurement unit 207 from after the inversion from H to L happens in the A sensor 105a is equal to the second elapse time is discriminated. If it is determined in step S202 that the inversion from H to L happens in the B sensor 105b, whether or not the fourth time which is measured by the B2 timer of the time measurement unit 207 from after the inversion from L to H happens in the B sensor 105b is equal to the second elapse time is discriminated. If it is determined in step S202 that the inversion from L to H happened in the B sensor 105b, whether or not the third time which is measured by the B1 timer of the time measurement unit 207 after the inversion from H to L happened in the A sensor 105a is equal to the second elapse time is discriminated. If each of the above elapse times is equal to the second elapse time, step S201 follows. If each of the above elapse times is shorter than the second elapse time, step S205 is repeated.

A case where the operation of the flowchart of FIG. 8 is started from the timing shown by the arrow T1 in FIG. 7 will be described as an example.

At the timing shown by the arrow T1 in FIG. 7, the energization switching from A−B− to A+B− is performed and step S202 follows.

At the timing shown by the arrow T1 in FIG. 7, since the H/L inversion does not happen in each of the A sensor 105a and the B sensor 105b substantially simultaneously with the energization switching, the discrimination result in step S202 is NO and the processing routine advances to step S203.

Step S203 is repeated until the inversion from L to H happens in the B sensor 105b at the timing shown by the arrow T2 in FIG. 7 and the processing routine advances to step S204.

Step S204 is repeated until the fourth time measured by the B2 timer of the time measurement unit 207 is equal to the first elapse time (±Tb+Tb31). If the fourth time measured by the B2 timer of the time measurement unit 207 is equal to the first elapse time (±ΔTb+Tb31), step S201 follows.

In step S201, the energization switching from A+B− to A+B+ is performed at the timing shown by the arrow T3 in FIG. 7. At this time, the inversion from H to L happens in the A sensor 105a at the timing shown by the arrow T4 in FIG. 7 substantially simultaneously with the timing shown by the arrow T3 in FIG. 7. Therefore, subsequently, when the processing routine advances to step S202, it is determined that the energization switching and the inversion from H to L happens in the A sensor 105a are substantially simultaneous. The processing routine advances to step S205.

In step S205, step S204 is repeated until the time A2 which is measured by the A2 timer of the time measurement unit 207 from after the inversion from L to H happens in the A sensor 105a is equal to the second elapse time (±Ta+Ta32). When the time A2 which is measured by the A2 timer of the time measurement unit 207 is equal to the second elapse time (±ΔTa+Ta32), the processing routine advances to step S201 again. That is, if the energization switching and the inversion from H to L happens in the A sensor 105a are substantially simultaneous, the energization switching of the A-phase coil 104a is not performed on the basis of the time A1 which is measured from after the inversion from H to L happened in the A sensor 105a. In place of it, the energization switching of the A-phase coil 104a is performed on the basis of the time A2 which is measured from after the inversion from L to H happens in the A sensor 105a.

The second term (Ta41) of the first elapse time is a value which is preset in accordance with the target rotation speed of the motor and the load which is applied to the motor. On the other hand, the second term (Ta32) of the second elapse time can be calculated by adding the correction time to the second term (Ta41) of the first elapse time.

The correction time can be calculated by the following equation.

(correction time)=(second term (Ta32) of the second elapse time)−(second term (Ta41) of the first elapse time)=(time(shown by A in the diagram) corresponding to current electrical degree 360°)× 180°÷360°).

As described above, in the second embodiment, control is made as follows.

If the inversion from H to L happens in the A sensor 105a substantially simultaneously with the energization switching of the A-phase coil 104a and the B-phase coil 104b, the energization switching based on the time A1 which is measured from after the inversion from H to L happens in the A sensor 105a is not performed. In place of it, the energization switching based on the time A2 which is measured from after the inversion from L to H happens in the A sensor 105a is performed. Similarly, if the inversion from L to H happens in the A sensor 105a substantially simultaneously with the energization switching of the A-phase coil 104a and the B-phase coil 104b, the energization switching based on the time A2 which is measured from after the inversion from L to H happens in the A sensor 105a is not performed. In place of it, the energization switching based on the time A1 which is measured from after the inversion from H to L happens in the A sensor 105a is performed. If the inversion from H to L happens in the B sensor 105b substantially simultaneously with the energization switching of the A-phase coil 104a and the B-phase coil 104b, the energization switching based on the third time which is measured from after the inversion from H to L happens in the B sensor 105b is not performed. In place of it, the energization switching based on the fourth time which is measured from after the inversion from L to H happens in the B sensor 105b is performed. If the inversion from L to H happens in the B sensor 105b substantially simultaneously with the energization switching of the A-phase coil 104a and the B-phase coil 104b, the energization switching based on the fourth time which is measured from after the inversion from L to H happens in the B sensor 105b is not performed. In place of it, the energization switching based on the third time which is measured from after the inversion from H to L happens in the B sensor 105b is performed.

Therefore, in the second embodiment, if the inversion from H to L happens in the A sensor 105a substantially simultaneously with the energization switching, the energization switching in which the inversion from H to L of the A sensor 105a is used as a reference is not performed. If the inversion from L to H happens in the A sensor 105a substantially simultaneously with the energization switching, the energization switching in which the inversion from L to H of the A sensor 105a is used as a reference is not performed. If the inversion from H to L happens in the B sensor 105b substantially simultaneously with the energization switching, the energization switching in which the inversion from H to L of the B sensor 105b is used as a reference is not performed. If the inversion from L to H happens in the B sensor 105b substantially simultaneously with the energization switching, the energization switching in which the inversion from L to H of the B sensor 105b is used as a reference is not performed. Therefore, the energization switching can be performed by the H/L inversion of the sensor in which the time of the zero-crossing of the ideal output voltage (alternate long and short dash line) can be obtained by the foregoing time correction.

Although the invention has been described in detail above with respect to the exemplary embodiments, the invention is not limited to those specific embodiments but various modifications in a range without departing from the essence of the invention are also incorporated in the invention.

The processes of the embodiments mentioned above may be realized by supplying a storing medium in which a program code of software embodying the foregoing functions to a system or an apparatus. A computer (or a CPU or MPU) of the system or apparatus reads out and executes the program code stored in the storing medium, so that the functions of the embodiments mentioned above can be realized. In this case, the program code itself read out of the storing medium realizes the functions of the embodiments mentioned above. The storing medium in which the program code has been stored constructs the invention. As a storing medium for supplying such a program code, for example, a floppy (registered trademark) disk, a hard disk, an optical disk, a magnetooptic disk, or the like can be used. Or, a CD-ROM, a CD-R, a magnetic tape, a non-volatile memory card, a ROM, or the like can be also used.

The invention incorporates not only a case where the computer executes the read-out program code, so that the functions of the embodiments mentioned above are realized but also a case where an OS (operating system) or the like which is operating on the computer executes a part or all of actual processes on the basis of instructions of the program code and the functions of the embodiments mentioned above are realized by those processes.

Further, the program code read out of the storing medium may be written into a memory provided for a function expanding board inserted in the computer or a function expanding unit connected to the computer. The invention also incorporates a case where, after that, the CPU or the like equipped for the function expanding board or the function expanding unit executes a part or all of the actual processes on the basis of instructions of the program code and the functions of the embodiments mentioned above are realized by those processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-132888, filed Jun. 10, 2010, which are hereby incorporated by reference herein in its entirety.

What is claimed is:

1. A driving apparatus comprising:
   a rotor on which different magnetic poles are magnetized alternately in a circumferential direction;
   a first coil configured to be energized to excite a first yoke;
   a second coil configured to be energized to excite a second yoke;
   a first detection unit configured to alternately detect the different magnetic poles of the rotor when the rotor is rotated, thereby outputting a signal;
   a second detection unit configured to alternately detect the different magnetic poles of the rotor when the rotor is rotated, thereby outputting a signal of a phase different from that of the signal which is output from the first detection unit;
   a time measurement unit configured to measure a first time from after the first detection unit detects a change of the magnetic pole of the rotor and measure a second time from after the second detection unit detects the change of the magnetic pole of the rotor;
   a correction value output unit configured to output correction values for correcting a difference between the signal which is output from the first detection unit when the first coil and the second coil are not energized and the signal which is output from the first detection unit when the first coil and the second coil are energized, and a difference between the signal which is output from the second detection unit when the first coil and the second coil are not energized and the signal which is output from the second detection unit when the first coil and the second coil are energized; and
   an energization control unit configured to switch an energization direction of the first coil on the basis of the first time which is measured by the time measurement unit and the correction value which is output from the correction value output unit and switch an energization direction of the second coil on the basis of the second time which is measured by the time measurement unit and the correction value which is output from the correction value output unit.

2. An apparatus according to claim 1, further comprising:
   a determination unit configured to determine whether or not the magnetic pole of the rotor which is detected by the first detection unit or the second detection unit changes substantially at the same time as a switching of the energization direction of the first coil or the second coil,
   wherein if it is determined by the determination unit that the magnetic pole of the rotor which is detected by the first detection unit changes substantially at the same time as the switching of the energization direction of the first coil or the second coil, the energization control unit controls to switch the energization direction of the first coil on the basis of the second time which is measured by the time measurement unit and the correction value which is output from the correction value output unit, and wherein if it is determined by the determination unit that the magnetic pole of the rotor which is detected by the second detection unit changes substantially at the same time as the switching of the energization direction of the first coil or the second coil, the energization control unit controls to switch the energization direction of the second coil on the basis of the first time which is measured by the time measurement unit and the correction value which is output from the correction value output unit.

3. An apparatus according to claim 2,
wherein the time measurement unit measures a time which is required from after the first detection unit detects the first magnetic pole of the rotor until the second magnetic pole different from the first magnetic pole of the rotor is detected and measures a time which is required from after the second detection unit detects the first magnetic pole until the second magnetic pole is detected.

4. An apparatus according to claim 1, further comprising:
a determination unit configured to determine whether or not the magnetic pole of the rotor which is detected by the first detection unit or the second detection unit changes substantially at the same time as a switching of the energization direction of the first coil or the second coil, wherein if it is determined by the determination unit that the magnetic pole of the rotor which is detected by the first detection unit changes substantially at the same time as a switching of the energization direction of the first coil or the second coil, the energization control unit controls to switch the energization direction of the first coil on the basis of a first time which is measured from the change of the magnetic pole of the rotor which is detected by the first detection unit before the change of the magnetic pole of the rotor which is detected by the first detection unit substantially at the same time as the switching of the energization direction of the first coil or the second coil, and wherein if it is determined by the determination unit that the magnetic pole of the rotor which is detected by the second detection unit changes substantially at the same time as the switching of the energization direction of the first coil or the second coil, the energization control unit controls to switch the energization direction of the second coil on the basis of a second time which is measured from the change of the magnetic pole of the rotor which is detected by the second detection unit before the change of the magnetic pole of the rotor which is detected by the second detection unit substantially at the same time as the switching of the energization direction of the first coil or the second coil.

5. An apparatus according to claim 4,
wherein the time measurement unit measures a time which is required from after the first detection unit detects the first magnetic pole of the rotor until the first magnetic pole is detected again, the time measurement unit measures a time which is required from after the first detection unit detects the second magnetic pole different from the first magnetic pole of the rotor until the second magnetic pole is detected, the time measurement unit measures a time which is required from after the second detection unit detects the first magnetic pole of the rotor until the first magnetic pole is detected, and the time measurement unit measures a time which is required from after the second detection unit detects the second magnetic pole until the second magnetic pole is detected.

6. An apparatus according to claim 1,
wherein the correction value output unit has a memory in which the correction value is previously stored, and outputs the correction value read out of the memory.

7. An apparatus according to claim 1,
wherein the first detection unit and the second detection unit alternately detect the magnetic poles, binarize the signals, thereby outputting the binarized signals, respectively.

8. A control method of a driving apparatus having a rotor on which different magnetic poles are magnetized alternately in a circumferential direction, a first coil configured to be energized to excite a first yoke, and a second coil configured to be energized to excite a second yoke, comprising:
a first detection step of alternately detecting the different magnetic poles of the rotor when the rotor is rotated, thereby outputting a signal;
a second detection step of alternately detecting the different magnetic poles of the rotor when the rotor is rotated, thereby outputting a signal of a phase different from that of the signal which is output in the first detection step;
a time measurement step of measuring a first time from after a change of the magnetic pole of the rotor is detected in the first detection step and measuring a second time from after the change of the magnetic pole of the rotor is detected in the second detection step;
a correction value output step of outputting correction values for correcting a difference between the signal which is output in the first detection step when the first coil and the second coil are not energized and the signal which is output in the first detection step when the first coil and the second coil are energized, and a difference between the signal which is output from the second detection unit when the first coil and the second coil are not energized and the signal which is output from the second detection unit when the first coil and the second coil are energized; and
an energization control step of switching an energization direction of the first coil on the basis of the first time which is measured in the time measurement step and the correction value which is output in the correction value output step and switching an energization direction of the second coil on the basis of the second time which is measured in the time measurement step and the correction value which is output in the correction value output step.

9. A non-transitory computer readable storing medium which stores a program for causing a computer to function as following units in a control method of a driving apparatus having a rotor on which different magnetic poles are magnetized alternately in a circumferential direction, a first coil configured to be energized to excite a first yoke, and a second coil configured to be energized to excite a second yoke,
a first detection unit configured to alternately detect the different magnetic poles of the rotor when the rotor is rotated, thereby outputting a signal;
a second detection unit configured to alternately detect the different magnetic poles of the rotor when the rotor is rotated, thereby outputting a signal of a phase different from that of the signal which is output from the first detection unit;

a time measurement unit configured to measure a first time from after the first detection unit detected a change of the magnetic pole of the rotor and measure a second time from after the second detection unit detected the change of the magnetic pole of the rotor;

a correction value output unit configured to output correction values for correcting a difference between the signal which is output from the first detection unit when the first coil and the second coil are not energized and the signal which is output from the first detection unit when the first coil and the second coil are energized, and a difference between the signal which is output from the second detection unit when the first coil and the second coil are not energized and the signal which is output from the second detection unit when the first coil and the second coil are energized; and an energization control unit configured to switch an energization direction of the first coil on the basis of the first time which is measured by the time measurement unit and the correction value which is output from the correction value output unit and switch an energization direction of the second coil on the basis of the second time which is measured by the time measurement unit and the correction value which is output from the correction value output unit.

10. A non-transitory computer readable storing medium which stores a program for causing a computer to function as each unit of the driving apparatus according to any one of claims 1 to 7.

* * * * *